(12) United States Patent
Tomita

(10) Patent No.: US 7,516,294 B2
(45) Date of Patent: Apr. 7, 2009

(54) LOGICAL PARTITIONING METHOD FOR STORAGE SYSTEM

(75) Inventor: Aki Tomita, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 701 days.

(21) Appl. No.: 11/117,390

(22) Filed: Apr. 29, 2005

(65) Prior Publication Data

US 2006/0200643 A1 Sep. 7, 2006

(30) Foreign Application Priority Data

Mar. 3, 2005 (JP) ............................. 2005-058333

(51) Int. Cl.
*G06F 12/06* (2006.01)
(52) U.S. Cl. .................. 711/173; 711/209; 709/226
(58) Field of Classification Search .................. 711/173, 711/170, 203, 202, 209; 713/1, 100; 709/221, 709/226
See application file for complete search history.

(56) References Cited

U.S. PATENT DOCUMENTS 5,253,344 A * 10/1993 Bostick et al. .................. 710/8
6,728,836 B1 4/2004 Lambright et al.
2004/0003063 A1 * 1/2004 Ashok et al. ................. 709/226

OTHER PUBLICATIONS

"Adaptive Algorithms for Managing a Distributed Data Processing Workload", J. Aman et al., IBM Systems Journal, vol. 36, No. 2, 1997, pp. 242-283.*
Cellular Disco: Resource Management Using Virtual Clusters on Shared-Memory Multiprocessors, K. Govil et al., 17th ACM Symposium on Operating Systems Principles, Dec. 1999, pp. 154-169.*

* cited by examiner

*Primary Examiner*—Pierre-Michel Bataille
(74) *Attorney, Agent, or Firm*—Antonelli, Terry, Stout & Kraus, LLP.

(57) ABSTRACT

When a static logical partition is set in a storage system, wasted resources are generated depending on the load state of the logical partition. Thus, after a logical partition is created, the storage system reconfigures the assignment of resources to the logical partition based on a predetermined configuration. The timing of a resource assignment reconfiguration is based on a job execution schedule, which is associated with a predetermined configuration, and which is executed by a computer utilizing the logical partition. There is also a constitution, wherein a computer sends a predetermined command to the storage system to instruct the storage system to reconfigure the resource assignment. There is also a constitution of a storage system, wherein a resource required for reconfiguring the resource assignment to the logical partition is reserved beforehand, and this reservation is canceled after the passage of a predetermined period of time.

15 Claims, 12 Drawing Sheets

440 SLPAR RESOURCE MAP (SLPAR1)

| JOB ID | | VIRTUALIZATION UNIT | Visible/ Invisible | CLASS | | |
|---|---|---|---|---|---|---|
| | | | | BASIC | JOB 1 | JOB 2 |
| ADDED/NOT ADDED | | – | – | – | ADDED | NOT ADDED |
| ASSIGNED/ RESERVED RESOURCE | VIRTUAL DEVICE | MANAGEMENT UNIT | Visible | Vdev 0, Vdev 3 | – | Vdev 5, Vdev 6 |
| | CACHE | STORAGE CONTROL UNIT | Invisible | 1GB | 1GB | 1GB |
| | PORT | – | visible | Port 0, Port 1 | Port 5 | – |
| | PROCESSOR | – | Invisible | Proc 0 | Port 3 | Proc 3 |

450 FREE RESOURCE TABLE

| RESOURCE NAME | ID | RESERVED SLPAR ID | RESERVED JOB ID | START TIME | EXPIRE TIME |
|---|---|---|---|---|---|
| VIRTUAL DEVICE | Vdev 5 | SLPAR1 | JOB 2 | S2 | E2 |
| | Vdev 6 | SLPAR1 | JOB 2 | S2 | E2 |
| | Vdev 7 | – | – | – | – |
| CACHE | 1GB | SLPAR1 | JOB 1 | S1 | E1 |
| | 1GB | SLPAR1 | JOB 2 | S2 | E2 |
| | 10GB | – | – | – | – |
| PORT | Port 5 | SLPAR1 | JOB 1 | S1 | E1 |
| PROCESSOR | Proc 3 | SLPAR1 | JOB 1 | S1 | E1 |
| | | SLPAR1 | JOB 2 | S2 | E2 |
| | Proc 4 | – | – | – | – |

FIG.2

400 MANAGEMENT UNIT

410 PHYSICAL RESOURCE TABLE

| PHYSICAL RESOURCE NAME | PHYSICAL RESOURCE ID | I/F |
|---|---|---|
| DISK DEVICES | Pdev 0 ⋮ | Pslot 0 ~ ⋮ |
| CACHE MEMORY | — | ADDRESS 0~256GB |
| PORT | Port 0 ⋮ | — |
| PROCESSOR | Proc 0 ⋮ | — |

420 PHYSICAL-VIRTUAL RESOURCE MAP

| VIRTUAL RESOURCE NAME | VIRTUAL RESOURCE ID | | PHYSICAL RESOURCE |
|---|---|---|---|
| VIRTUAL DEVICE | Vdev 0 ⋮ | Vslot 0 ⋮ | (Pdev 0, Pslot GROUP) ⋯ ⋮ |
| CACHE | SEGMENT SG 0 | | ADDRESS X ⋮ |

FIG.3

150-1 SLPAR RESOURCE TABLE (SLPAR1)

| CLASS | ADDED/ NOT ADDED | JOB OUTLINE | RESOURCE NAME | ASSIGNED RESOURCE |
|---|---|---|---|---|
| BASIC | — | — | VIRTUAL DEVICE | Vdev 0, Vdev 3 |
| | | | CACHE | 1GB |
| | | | PORT | Port 0, Port 1 |
| | | | PROCESSOR | 1 |
| JOB 1 | ADDED | START TIME S1, EXPIRE TIME E1 RC_resync (Lvol 0, Lvol 1) | VIRTUAL DEVICE | — |
| | | | CACHE | 1GB |
| | | | PORT | Port 5 |
| | | | PROCESSOR | 1 |
| JOB 2 | NOT ADDED | START TIME S2, EXPIRE TIME E2, SI_resync (Lvol 2, Lvol 3) | VIRTUAL DEVICE | Vdev 5, Vdev 6 |
| | | | CACHE | 1GB |
| | | | PORT | — |
| | | | PROCESSOR | 1 |

FIG.4

440 SLPAR RESOURCE MAP (SLPAR1)

| JOB ID | | | Visible/Invisible | CLASS | | |
|---|---|---|---|---|---|---|
| | | | | BASIC | JOB 1 | JOB 2 |
| ADDED/NOT ADDED | | | — | — | ADDED | NOT ADDED |
| ASSIGNED/RESERVED RESOURCE | VIRTUAL DEVICE | VIRTUALIZATION UNIT | Visible | Vdev 0, Vdev 3 | — | Vdev 5, Vdev 6 |
| | CACHE | MANAGEMENT UNIT | Invisible | 1GB | 1GB | 1GB |
| | PORT | STORAGE CONTROL UNIT | visible | Port 0, Port 1 | Port 5 | — |
| | PROCESSOR | | Invisible | Proc 0 | Port 3 | Proc 3 |

450 FREE RESOURCE TABLE

| RESOURCE NAME | ID | RESERVED SLPAR ID | RESERVED JOB ID | START TIME | EXPIRE TIME |
|---|---|---|---|---|---|
| VIRTUAL DEVICE | Vdev 5 | SLPAR1 | JOB 2 | S2 | E2 |
| | Vdev 6 | SLPAR1 | JOB 2 | S2 | E2 |
| | Vdev 7 | — | — | — | — |
| CACHE | 1GB | SLPAR1 | JOB 1 | S1 | E1 |
| | 1GB | — | JOB 2 | S2 | E2 |
| | 10GB | — | — | — | — |
| PORT | Port 5 | SLPAR1 | JOB 1 | S1 | E1 |
| | Proc 3 | SLPAR1 | JOB 2 | S2 | E2 |
| PROCESSOR | Proc 4 | — | — | — | — |

FIG.5

370 TEMPORAL RESOURCE TABLE (JOB 1)

| JOB ID | ITEM | ASSIGNED RESOURCE |
|---|---|---|
| JOB 1 | VIRTUAL DEVICE | — |
| | CACHE | SG0, SG2,··· |
| | PORT | Port 5 |
| | PROCESSOR | Proc 3 |

FIG.6

900 SLPAR RESOURCE NOTIFICATION COMMAND

| SeqID | SLPAR RESOURCE NOTIFICATION COMMAND ID | SLPAR ID | RESOURCE LIST |
|---|---|---|---|
| 900-1 | 900-2 | 900-3 | 900-4 |

910 SLPAR RESOURCE NOTIFICATION REPLY

| SeqID | SLPAR RESOURCE NOTIFICATION REPLY ID | ADDED/ NOT ADDED |
|---|---|---|
| 910-1 | 910-2 | 910-3 |

901 SLPAR JOB START COMMAND

| SeqID | SLPAR JOB START COMMAND ID | SLPAR ID | JOB ID |
|---|---|---|---|
| 901-1 | 901-2 | 901-3 | 901-4 |

911 SLPAR JOB START REPLY

| SeqID | SLPAR JOB START REPLY ID | ADDED/ NOT ADDED |
|---|---|---|
| 911-1 | 911-2 | 911-3 |

902 SLPAR JOB FINISH COMMAND

| SeqID | SLPAR JOB FINISH COMMAND ID | SLPAR ID | JOB ID |
|---|---|---|---|
| 902-1 | 902-2 | 902-3 | 902-4 |

912 SLPAR JOB FINISH REPLY

| SeqID | SLPAR JOB FINISH REPLY ID |
|---|---|
| 912-1 | 912-2 |

FIG. 10
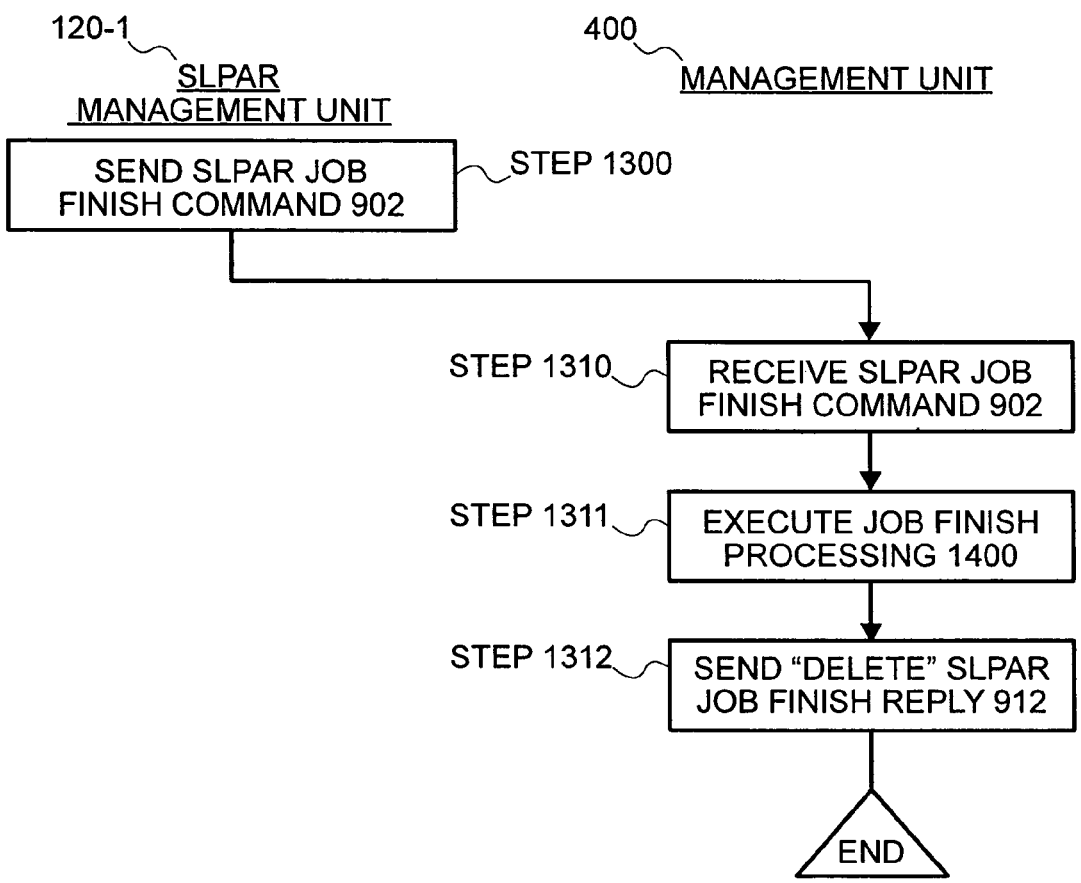
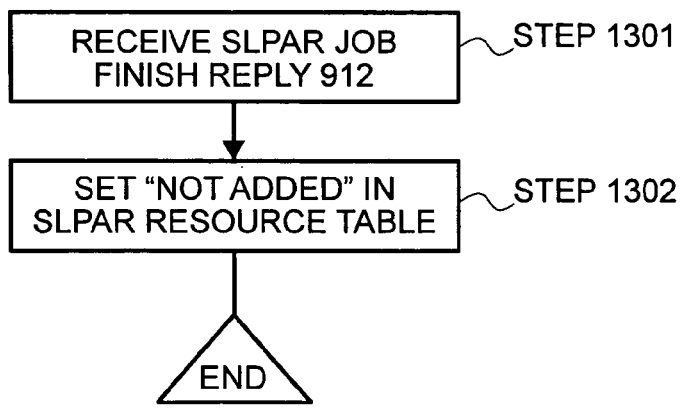

LOGICAL PARTITIONING METHOD FOR STORAGE SYSTEM

BACKGROUND OF THE INVENTION

The present invention relates to a storage system, and, more particularly, to a storage system performance management method.

The need for storage consolidation designed to reduce the initial costs and maintenance costs of storage systems has increased in recent years. In the future, storage consolidation technology is expected to make it possible for a single storage system to store the data of a plurality of independent departments or companies. In this case, technology capable of providing a single storage system as a plurality of virtual storage systems (Virtual storage), more specifically, logical partitioning technology for a storage system (Storage Logical Partitioning), will be required so that management and performance do not interfere with one another inside a storage system.

U.S. Pat. No. 6,728,836 discloses a technique for specifying cache segments, which partition the hardware resources possessed by a storage system, more specifically, the cache memory, into segments of different sizes, and for enabling these segments to be utilized by each host system group connected to the storage system. With this technology, it is possible to allow a specified host system group to utilize more cache memory storage capacity than another host system group by limiting the cache segments that a certain host system group can use.

SUMMARY OF THE INVENTION

Heretofore, in order to guarantee a fixed level of service in the storage system, it was necessary to assign a hardware resource (cache memory capacity) to a logical partition by tailoring it to the peak load in the logical partition. In this case, there are times when the utilization factor of the cache memory deteriorates. That is, when a logical partition is established, the administrator will set the cache memory capacity by taking into consideration the load of all sorts of conditions under which this logical partition can be utilized. Therefore, when the load is smaller than the maximum imaginable load, only a portion of the cache memory capacity assigned in advance to this logical partition is utilized. In addition, the utilization of this surplus cache memory capacity by another logical partition is not taken into consideration in prior systems. Consequently, there is an area of cache memory which is not used, and so the cache memory utilization factor deteriorates. This results in a valuable hardware resource being wasted.

Therefore, it is an object of the present invention to continue to satisfy the required service level of a storage system even when the storage system load changes, and to enhance the utilization factor of the hardware resources.

The present invention is constituted such that, after preparing logical partitions in a storage system, the storage system reconfigures the assignment of resources to a logical partition on the basis of a predetermined configuration. For example, the timing of the resource assignment reconfiguration can be based on the execution schedule of a job, which is associated with the predetermined configuration, and which is executed by a computer using the logical partition.

Further, a constitution, wherein a computer sends a predetermined command to the storage system to instruct the storage system to reconfigure a resource assignment, is also considered.

In addition, a constitution, wherein the storage system reserves beforehand a resource required for reconfiguring the resources assigned to a logical partition, and then cancels this reservation after a predetermined time period has elapsed (for example, subsequent to the completion of the execution of a related job), is also considered.

Further, a constitution, wherein there is a plurality of predetermined configurations, among which there exists a basic pattern, more specifically, a pattern in which there is set information on the amount of resources, which are utilized on average by a logical partition, is also considered. In this case, a constitution, wherein the storage system assigns resources to a logical partition on the basis of the basic pattern subsequent to the completion of the initial setting, is considered.

In addition, a constitution, wherein each pattern is set in accordance with the distinctive characteristics of a job being executed by a computer, and in accordance with the execution of this job, the storage system selects a pattern corresponding to this job, and executes the reconfiguration of a resource assignment to a logical partition, is also considered.

BRIEF DESCRIPTION OF THE DRAWINGS

FIG. 2 is a diagram showing examples of a physical resource table and a physical-virtual resource map;

FIG. 3 is a diagram showing an example of an SLPAR resource table;

FIG. 4 is a diagram showing an example of an SLPAR resource map;

FIG. 5 is a diagram showing an example of a temporal resource table;

FIG. 6 is a diagram showing examples of a SLPAR resource notification command and reply, SLPAR job start command and reply, and SLPAR job finish command and reply;

FIG. 10 is a diagram showing an example of a flowchart of SLPAR dynamic resource assignment processing (at job finish);

DESCRIPTION OF THE PREFERRED EMBODIMENTS

Figure 1:
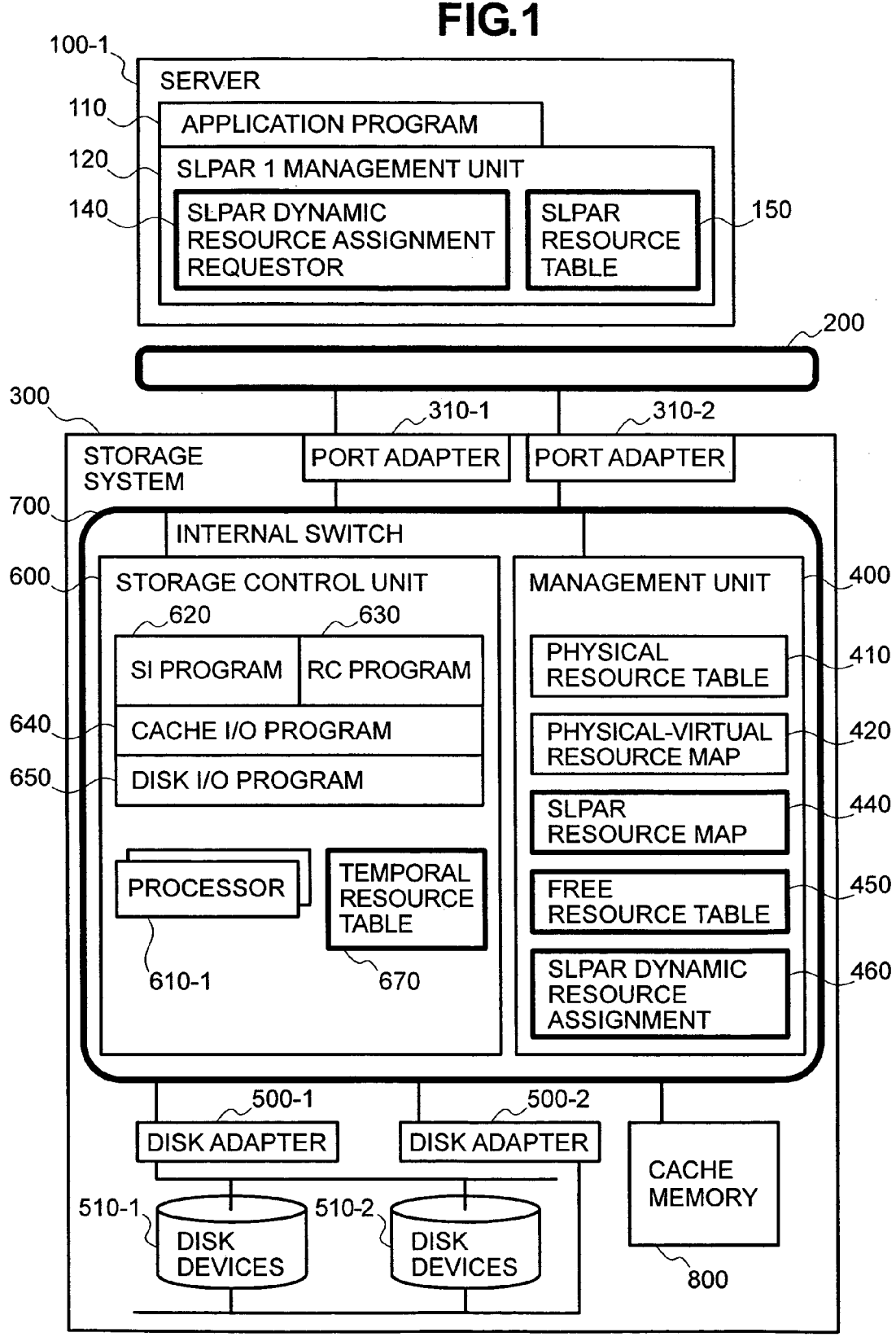
FIG. 1 is a diagram showing an embodiment of a computer system in accordance with the present invention.

FIG. 1 is a diagram showing an embodiment of a computer system in accordance with the present invention. Hereinbelow, the same reference numerals will be assigned to the same elements, and when it is necessary to make a distinction between the same elements, a hyphen (100-1 and so forth) will be used.

The computer system has a storage system 300, a computer (hereinafter, also referred to as a "server") 100, and a network 200 for connecting the storage system 300 to the server 100.

The storage system 300 has adapters 310, which have ports connected to the network 200; a storage control unit 600; disk adapters 500; a management unit 400; and physical devices

510. Devices other than the physical devices 510 are interconnected via an internal network 700 (for example, a switch, selector or bus). The physical devices 510 and internal network 700 are interconnected via the disk adapters 500.

The storage control unit 600 has processors 610 for controlling the processes executed inside the storage system 300, for example, the process of replicating data inside the system (hereinafter, also referred to as a "snapshot (SI)"), the process of copying data between storage systems 300 (hereinafter, also referred to as "remote copying (RC)"), and the process of inputting and outputting (hereinafter "I/O") between a server 100 and the storage system 300; and memory for storing the various programs executed at the time of these controls. In memory, for example, there are stored an SI program 620, an RC program 630, a cache I/O program 640 for controlling the inputting and outputting of data to and from cache memory 800, a disk I/O program 650 for controlling the inputting and outputting of data to and from physical devices 510, and a temporal resource table 670.

Furthermore, the storage control unit 600, in accordance with logical partition information set by the management unit 400, utilizes resources assigned to a logical partition to execute a job requested by a server 100 corresponding to this logical partition. Here, the storage control unit 600 executes the assignment of specific resources based on information set by the management unit 400, and it stores this information in the temporal resource table 670. Then, the storage control unit 600 executes processing using the logical partition on the basis of the information in the temporal resource table 670. The contents of the temporal resource table 670 will be explained below.

The management unit 400 manages the physical resources and virtual resources inside the storage system 300, and the assignment of resources to various logical partitions (hereinafter, also referred to as "SLPAR (Storage Logical Partition)"). Furthermore, a constitution, wherein the management unit 400 and storage control unit 600 are treated as a single management unit, is also considered as a separate embodiment.

Here, physical resource refers to the ports 320, processors 610 and other such hardware that actually exist in the storage system 300. Conversely, virtual resource refers to virtual devices, which are constituted from physical devices and are provided to a server 100. For example, a virtual device created by a RAID structure from the storage areas of a plurality of physical devices 510, and individual cache memory areas, which segment cache memory 800 into fixed sizes, are virtual resources.

A physical device 510 is a storage device having a storage medium. More specifically, this can be a hard disk drive, a flash memory, or a DVD. These physical devices 510 are controlled by a disk adapter 500. Further, as described hereinabove, virtual devices are created on the basis of the storage areas possessed by these physical devices 510.

The server 100 is an ordinary computer having a processor and memory. Individual servers 100 store application programs 110 in this memory. Further, individual servers 100 have an SLPAR management unit 120 for recognizing and controlling storage logical partitions which are established in a storage system 300 as a single virtual storage system. Furthermore, the respective systems of the server 100 and storage system 300, including this management unit 120, can be realized by combining general-purpose processors and software programs with dedicated hardware.

The programs and information stored in the storage control unit 600, management unit 400, and SLPAR management unit 120 will be explained hereinbelow.

The management unit 400 manages information regarding the relationships between physical resources and virtual resources, as well as information regarding the correspondence between physical resources, virtual resources and the respective SLPAR. More specifically, the management unit 400 has a physical resource table 410, a physical-virtual resource map 420, a SLPAR resource map 440, a free resource table 450, and a SLPAR dynamic resource assignment program 460.

FIG. 2 is a diagram showing an example of a physical resource table 410 and a physical-virtual resource map 420. In the physical resource table 410, there is registered information on physical devices 510, cache memory 800, ports 320, and processors 610, which are the physical resources possessed by the storage system 300. This registration is carried out by a systems administrator in accordance with inputting by way of a network or from a storage system terminal.

More specifically, the physical resource table 410 has a field for registering a physical resource name for each physical resource, a field for registering an ID assigned to each physical resource, and an I/F field for registering addresses for managing these physical resources.

The physical devices 510 are managed by specifying an ID for each physical device 510 and assigning the storage area of each physical device 510 to a slot of a fixed size. Therefore, identifier information assigned to each slot is registered in the I/F field. Cache memory 800 is managed using addresses for accessing cache memory 800 from the storage control unit 600. Consequently, information is not registered in the ID field. The ports 320 are managed by assigning an ID for each port. The processors 610 are managed by assigning an ID for each processor. Consequently, nothing is registered in the I/F fields related to the ports and processors.

Information on the correspondence between virtual resources and the physical resources for constituting these virtual resources is managed in the physical-virtual resource map 420. More specifically, in the physical-virtual resource map 420, there is registered information on virtual devices and cache segments, which are virtual resources created on the basis of physical resources. The registration of this information is carried out in the same manner as for the physical resource table 410.

The physical-virtual resource map 420 has, for each virtual resource, a field for registering a virtual resource name, a field for registering an identifier assigned to a virtual resource, and a field for registering physical resource information (identifier and so forth) corresponding to this virtual resource. With regard to virtual devices, an ID is assigned to each virtual device, and information on the physical device slot, which constitutes a virtual device, is registered in the field for registering physical resource information. As for cache memory, an ID is assigned to a segment of a fixed size, and information on the start address of individual segments is registered in the field for registering physical resource information.

FIG. 4 is a diagram showing an example of the constitution of a SLPAR resource map 440 and an example of the constitution of a free resource table 450.

The management unit 400 has a SLPAR resource map 440 like the one shown in FIG. 4 for each SLPAR established in the storage system 300. However, it goes without saying that the constitution of the table is not limited to the format of FIG. 4. The SLPAR resource map 440 manages information on the physical resources and virtual resources assigned to the SLPAR corresponding to the table.

More specifically, for respective physical resources and virtual resources (hereinafter, there will be times when these are referred to collectively as "resources"), one SLPAR resource map 440 has a field for registering information on the virtual resource manager, a field for registering information as to whether or not a physical resource/virtual resource ID will be provided to the SLPAR management unit 120 (Visible/Invisible), and a field for registering physical resource and virtual resource configuration pattern groups (hereinafter referred to also as "classes") assigned to a SLPAR corresponding to the SLPAR resource map 440.

More specifically, the patterns comprising a class take into consideration the nature of a process (hereinafter referred to also as a "job") to be executed by this SLPAR, the total amount of physical resources and virtual resources that the storage system 300 possesses, and the number of SLPAR established in the storage system 300, and the administrator determines the numerical value. Then, the administrator registers a configuration pattern, determined beforehand, in the management unit 400 of the storage system 300.

For example, for a job requiring a high transaction performance, a configuration pattern for increasing the port adapter 310 and cache usage more than usual is set; for a job requiring high sequential performance, a configuration pattern for increasing disk adapters 500 more than usual is set; and, for a job that will utilize TC or SI, a configuration pattern for increasing the cache capacity or shared memory capacity more than usual is set.

In this embodiment, a "Basic" pattern is set in all (or a portion) of the SLPAR. More specifically, either an estimated value of the average amount of resources believed to be consumed by a SLPAR, or a value for allocating resources equitably to each SLPAR is set. In other words, the term "Basic" refers to the amount of resources required to perform a common process. By setting this "Basic" configuration pattern, an administrator eliminates the need to set individual patterns for all jobs. However, as a separate embodiment, an administrator can calculate the amount of resources allocated to a job, and set that configuration pattern in the management unit 400 in advance for all jobs executed by the SLPAR of the storage system 300. In this embodiment, a "Basic" configuration pattern, plus a number of configuration patterns for jobs for which there is a particular need to reconfigure resource assignments, are registered in classes. Here, jobs for which there is a particular need to reconfigure resource assignments are considered to be either processes required for stable service, or jobs for which a strict service level agreement is in place.

More specifically, in FIG. 4, the configuration patterns "Basic", "Job 1" and "Job 2" are registered under the Class for SLPAR 1. For each configuration pattern, information on the physical resources and virtual resources assigned for a configuration pattern is registered using the ID of each resource. Furthermore, in this embodiment, for the patterns "Job 1" and "Job 2", information as to which resources will be added to the resources of the "Basic" configuration pattern is registered. Therefore, when SLPAR 1 processes a job of configuration pattern "Job 1", the resources assigned to SLPAR 1 constitute the sum of the amount of resources set for the "Basic" configuration pattern and the amount of resources set in the "Job 1" configuration pattern. Furthermore, as a separate embodiment, the total amount of resources assigned to a SLPAR can be registered for each configuration pattern.

Further, with regard to the configuration patterns, information indicating which pattern is currently set for a SLPAR can be registered. In FIG. 4, since the "Job 1" configuration pattern is set (in other words, a job corresponding to the Job 1 pattern is being executed by SLPAR 1), the information "Added" is registered for the "Job 1" configuration pattern.

Also, since the "Job 2" configuration pattern is not set, the information "Not Added" is registered. This information changes each time a configuration pattern setting changes.

Further, "Virtual Resource Manager" signifies the unit, which manages the correspondence between virtual resources and physical resources. For example, the virtual resource manager of a virtual device is the management unit 400, and the virtual resource manager of the cache is the storage control unit 600. Since the ports and processors are not virtual resources, they do not have a virtual resource manager.

Furthermore, in FIG. 4, Proc0 is assigned as the processor for the "Basic" configuration pattern, Proc3 is assigned as the processor for the "Job 1" configuration pattern, and Proc3 is assigned as the processor for the "Job 2" configuration pattern. The reason for assigning the same Proc3 as the processor for "Job 1" and "Job 2" here is because the execution time period for the job corresponding to "Job 1" (time S1 through time E1) and the execution time period for the job corresponding to "Job 2" (time S2 through time E2) do not overlap (execution time periods will be explained below). Different processors are assigned when these execution time periods overlap.

The free resource table 450 is used for managing physical resources and virtual resources, which, although incorporated in the storage system 300, are not assigned to the "Basic" configuration pattern of the SLPAR. By managing this free resource table 450, the management unit 400 can dynamically assign resources to SLPAR while avoiding duplicate assignments of resources to a SLPAR during the same time period. Furthermore, in the case of an embodiment in which a "Basic" configuration pattern is not established, the information on all of the resources in the storage system 300 will be registered in this free resource table 450.

More specifically, for each resource, the free resource table 450 has a field for registering an ID and other such information describing resources not assigned to the "Basic" configuration pattern (hereinafter, also referred to as "free resources"), a field for registering information (ID and so forth) indicating a SLPAR for which these resources are reserved, a field for registering information indicating the configuration patterns these resources will use, and a field for registering information concerning the time periods during which a reservation will be executed. Free resource information is determined by an administrator on the basis of the "Basic" configuration pattern, and it is registered in the storage system 300 via a management terminal. Further, reservation information, such as a reserved SLPAR ID, is set by the management unit 400 when a resource is reserved.

Here, "Reserve" signifies determining beforehand the resources to be assigned on a priority basis to a job and registering this information in the free resource table 450 when the execution schedule of a job in a certain SLPAR is known. When reservation information is set in the free resource table, these resources are assigned on a priority basis to the job for which they were reserved.

In the free resource table 450 of FIG. 4, virtual devices Vdev5 and Vdev6, cache 1 GB and processor Proc3 are reserved for Job 2 of SLPAR 1 during the time period from S2 to E2, and cache 1 GB and processor Proc3 are reserved for Job 1 of SLPAR 1 for the time period from S1 to E1. Further, cache 10 GB and processor Proc4 have not been reserved for any job.

Next, the information managed by the SLPAR management unit 120 of a server 100 will be explained. The SLPAR management unit 120 has a SLPAR resource table 150. FIG. 3 is a diagram showing a specific example of a SLPAR resource table 150.

Information related to a SLPAR, which a server 100 will utilize, is registered in the SLPAR resource table 150. The SLPAR to be utilized by each server 100 is specified in advance. The registration of information to the SLPAR resource table 150 can be carried out by an administrator inputting this information for each server 100, or by the server 100 receiving the information from the storage system 300. To reduce the burden on the administrator, it is preferable that the administrator carries out a batch registration of information concerning all SLPAR in the SLPAR resource map 440 of the storage system 300, and that each server 100 then acquires this information and registers the information in its respective SLPAR resource table 150. Further, information concerning the relationship between the respective servers 100 and SLPAR is registered in the storage system 300 beforehand.

Furthermore, as will be explained hereinbelow, each server 100 acquires (either from the administrator or from the storage system 300) information concerning the configuration patterns of a class when settings are reconfigured (for example, at initial setting time), and registers it in its own SLPAR resource table 150.

Information on assigned resources is registered in a SLPAR resource table 150 for each configuration pattern of a class. More specifically, in FIG. 3, virtual devices Vdev0 and Vdev3, cache 1 GB, ports Port0 and Port 1, and one processor are assigned to the "Basic" configuration pattern of SLPAR 1, corresponding to server 100-1. When server 100-1 executes a job corresponding to the "Job 1" pattern using SLPAR 1, cache 1 GB, port Port5, and one processor are added to the resources of the "Basic" configuration pattern. When server 100-1 executes a job corresponding to the "Job 2" configuration pattern using SLPAR 1, cache 1 GB and one processor are added to the resources of the "Basic" configuration pattern.

Furthermore, in addition to this information, the start and expiration times of jobs corresponding to each "Job" configuration pattern, and job summary information is also registered. For example, a job corresponding to the "Job 1" configuration pattern is a job, which executes resync between logical volumes Lvol0 and Lvol1, which are a remote copy pair, on a schedule which starts at timing S1 and expires at timing E1. Further, a job corresponding to the "Job 2" configuration pattern is a job, which executes resync between logical volumes Lvol2 and Lvol3, which are a snapshot pair, on a schedule which starts at timing S2 and expires at timing E2.

In addition, with regard to "Job" configuration patterns, information related to the execution status of a job corresponding to these patterns is registered in the same manner as was explained for SLPAR resource map 440. More specifically, in a SLPAR resource table 150, since a job corresponding to "Job 1" is being executed, "Added" is registered, and since a job corresponding to "Job 2" is not being executed, "Not Added" is registered.

Furthermore, with regard to resources registered as "invisible" in the resource map 440 (in this figure, cache and processors), only numerical quantity information is registered in the SLPAR resource table 150. This is because, in this embodiment, the specification of resources that can be arbitrarily determined as resources to be used at job execution (the port linked to a host must always be the same, but when it comes to processors and cache, so long as the specified amount can be secured, any processor and any cache is good) is left entirely up to the discretion of the storage system 300.

As described hereinabove, in the SLPAR resource map 440 and SLPAR resource table 150, capacity information is the only thing specified for a cache; a cache segment ID for specifying an actual virtual resource is not assigned. The assignment of actual cache segments to each job is carried out by the storage control unit 600 using the cache capacity assigned to the SLPAR as the upper limit. The processor of the storage control unit 600 executes the cache I/O program at this time.

The temporal resource table 670 possessed by the storage control unit 600 has information registered therein for managing specific assignments, such as cache memory to the respective SLPAR, which is specified in the SLPAR resource map 440. FIG. 5 is a diagram showing a specific example of this temporal resource table 370. In FIG. 5, information, which specifically shows that cache segments SG0, SG2 and so forth were assigned to satisfy the cache capacity required by the "Job 1" configuration pattern when executing a job corresponding to the "Job 1" configuration pattern, is registered on the basis of information that the storage control unit 600 registered in the SLPAR resource map 440. The storage control unit 600 controls the execution of a job using the SLPAR based on information registered in this temporal resource table 670 as described hereinabove.

An outline of the operation of a system of this embodiment will be briefly explained hereinbelow.

The system administrator sets a class comprising a "Basic" configuration pattern, that is, assigns resources to respective SLPAR when creating a SLPAR in the storage system 300. At this time, the administrator sets timing information in a configuration pattern for patterns corresponding to jobs for which the execution time period has been determined beforehand. Furthermore, a storage system 300, for which a plurality of SLPAR has been set, is either utilized by SLPAR being assigned respectively to a plurality of departments inside a single company, or is utilized in a configuration in which SLPAR are assigned respectively to a plurality of users by a storage service provider, and the respective users utilize these SLPAR.

After the setting has been made, each server 100 commences processing using a SLPAR having resources set in a "Basic" configuration pattern, which it assigned to itself.

(In the case of an embodiment for which a "Basic" configuration pattern is not assigned, a server 100 sends a resource assignment request for its initial job to the storage system 300.)

At the stage for executing a job corresponding to any of the configuration patterns comprising a pre-registered class, the respective servers 100 notify the storage system 300 of the start of execution of that job. Upon receiving this notification, the storage system 300 retrieves the class in which the configuration pattern corresponding to the notified job is registered, and based on this registered information, reconfigures the resource assignment to the target SLPAR. If there is reservation information at this time, the storage system 300 assigns the reserved resources to the SLPAR. After reconfiguration, the storage system 300 notifies the server 100 that reconfiguration is complete.

A server 100, which is thus notified, starts actual job execution. After the job is finished, the server 100 notifies the storage system 300 that the job is finished. Upon receiving the job finished notification, the storage system 300 cancels the added resources from the SLPAR by reconfiguring the setting of the resources assigned to the SLPAR at job start to the "Basic" configuration pattern.

The commands sent and received between a server 100 and the storage system 300 during the above-mentioned processing will be explained hereinbelow. More specifically, as shown in FIG. 6, there are a SLPAR resource notification command 900 and a reply 910, a SLPAR job start command 901 and a reply 911, and a SLPAR job finish command 902 and a reply 912.

The SLPAR resource notification command 900 is issued from the storage system 300 to a server 100 associated with the SLPAR for which resources are to be set when setting the resources for a SLPAR, such as when a SLPAR is created, or when a new job is added to a SLPAR. The SLPAR resource notification command specifically comprises the information of a sequence ID 900-1 for identifying each command; a command ID 900-2 for indicating that it is a SLPAR resource notification command; a SLPAR ID 900-3 for specifying the SLPAR to which the assigned resource notification is to be sent; and a resource list 900-4 showing the assigned resource configuration for the SLPAR in question.

The server 100 that receives a SLPAR resource notification command sends the storage system 300 a SLPAR resource notification reply 910. The SLPAR resource notification reply 910 specifically comprises the information of a sequence ID 910-1 for identifying each reply; a reply ID 910-2 indicating that it is a SLPAR resource notification reply; and information 910-3 indicating whether or not resources were added.

The SLPAR job start command 901 is issued to the storage system 300 from the server 100 executing a job at the start of job execution. The SLPAR job start command 901 specifically comprises information of a sequence ID 901-1 for identifying each command; a command ID 901-2 indicating that it is a SLPAR job start command; a SLPAR ID 901-3 indicating the SLPAR which requested additional resources; and a job ID 901-4 indicating the job to be started.

Upon receiving this SLPAR job start command 901, the storage system 300 sends a SLPAR job start reply 911 to the server 100 that sent the SLPAR job start command 901 after reconfiguring the resource assignment. The SLPAR job start reply 911 specifically comprises the information of a sequence ID 911-1 for identifying each reply; a reply ID 911-2 indicating that it is a SLPAR job start reply; and information in 911-3 indicating whether or not resource were added.

The SLPAR job finish command 902 is sent to the storage system 300 from the server 100 that finished executing a job at the time of job execution completion. The SLPAR job finish commend 902 specifically comprises information of a sequence ID 902-1 for identifying each command; a command ID 902-2 indicating that it is a SLPAR job finish command; a SLPAR ID 902-3 indicating the SLPAR which requested the cancellation of resources; and a job ID 902-4 indicating the finished job.

Upon receiving this SLPAR job finish command 902, the storage system 300 reassigns resources to the SLPAR based on the content of the command (for example, cancels resources). Thereafter, the storage system 300 sends a SLPAR job finish reply 912 to the server 100 that sent the SLPAR job finish command 902. The SLPAR job finish reply 912 specifically comprises the information of a sequence ID 912-1 for identifying each reply; and a reply ID 912-2 indicating that it is a SLPAR job finish reply.

Details of the processing of this embodiment will be explained hereinbelow by dividing this explanation into a part for when a resource assignment is set, a part for when a job is started, and a part for when a job is finished.

Figure 7:
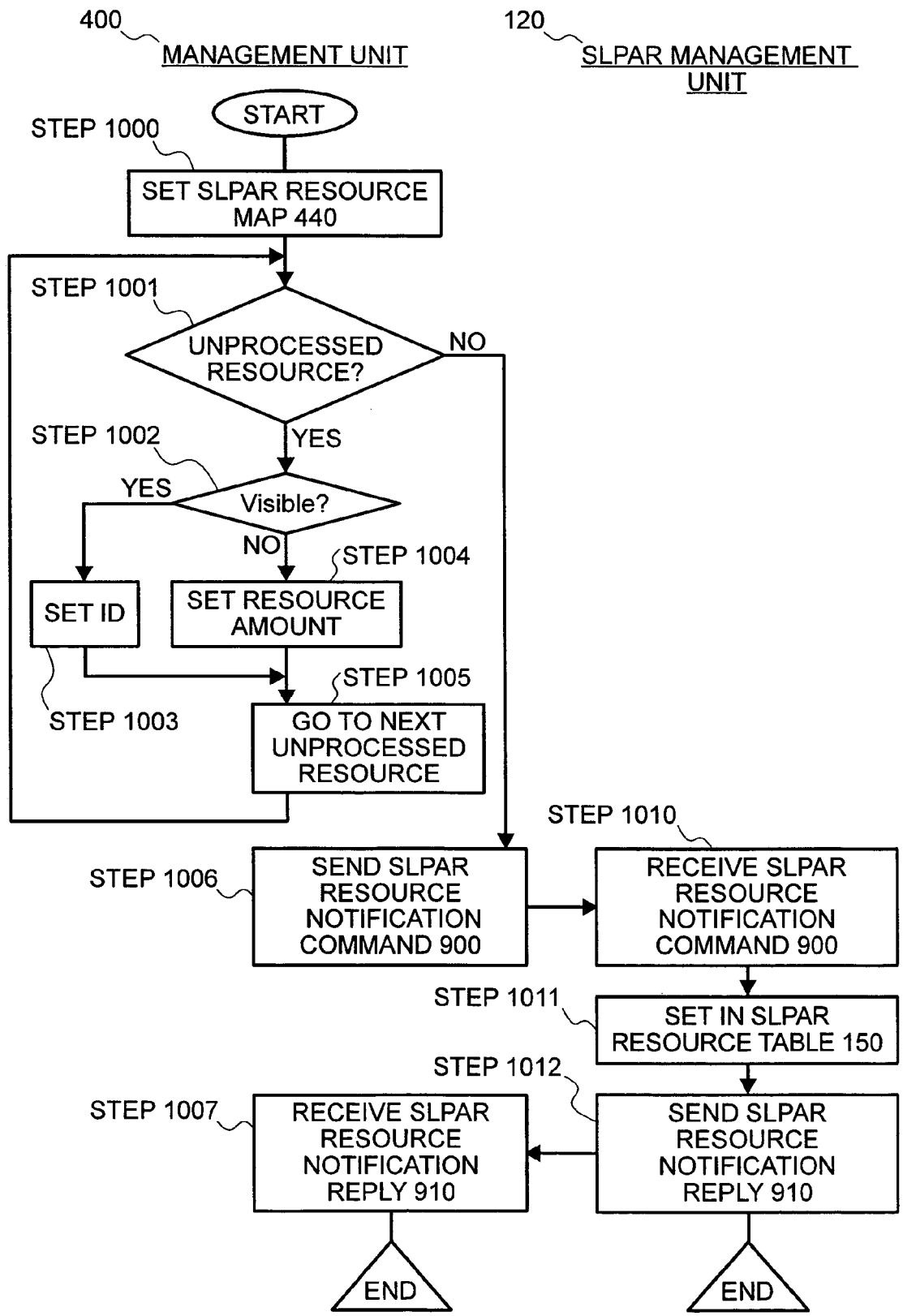
FIG. 7 is a diagram showing an example of a flowchart of SLPAR resource notification processing.

FIG. 7 is a diagram showing an example of the processing procedures between the storage system 300 and a server 100 when a resource assignment is set (hereinafter referred to SLPAR resource notification processing 1000). This process is executed when information of the setting of a resource assignment for a SLPAR is exchanged between the storage system 300 and a server 100.

In FIG. 7, on the basis of instructions from the storage system 300 administrator, the management unit 400 executes the SLPAR dynamic resource assignment program 460, and sets the basic resources for each SLPAR, or the resources for when a job is executed in the SLPAR resource map 440 (Step 1000). Next, the management unit 400 references the set SLPAR resource map 440, and it determines whether or not the assigned resources are visible resources (Step 1002). When they are visible, the management unit 400 sets the information of the physical resource ID/virtual resource ID registered in the SLPAR resource map 440 in the resource list 900-4 of the SLPAR resource notification command 900 (Step 1003). Conversely, when the resources are invisible, the management unit 400 sets the resource amount in the resource list 900-4 of the SLPAR resource notification command 900 (Step 1004).

The management unit 400 carries out the processing of Step 1002 through Step 1004 for all the resources assigned to a SLPAR. Thereafter, it sends a resource notification command 900 for the created SLPAR to the server 100 using this SLPAR (Step 1006).

When the server 100 receives the SLPAR resource notification command 900 (Step 1010), the SLPAR management unit 120 of the server 100 executes the SLPAR dynamic resource assignment program 140, thereby setting the assigned resources of the class of the SLPAR resource table 150 based on the resource list 900-4 (Step 1011). After setting, the server 100 sends a SLPAR resource notification reply 901 to the storage system 300 (Step 1012).

Furthermore, the storage system 300 repeats the processing of Steps 1001 through 1007 for all SLPAR.

Figure 8:
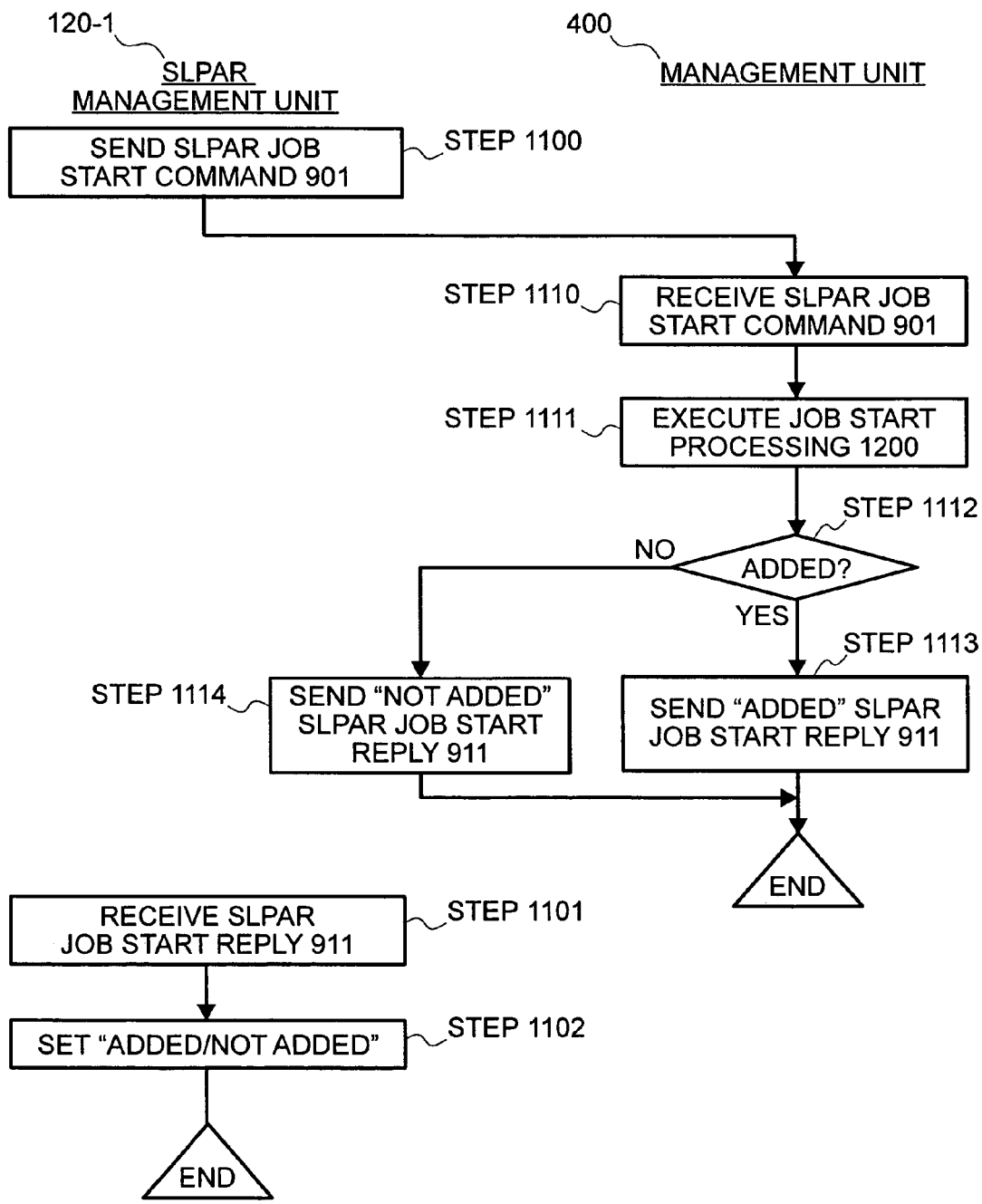
FIG. 8 is a diagram showing an example of a flowchart of SLPAR dynamic resource assignment processing (at job start)

FIG. 8 is a diagram showing an example of the processing procedures between the storage system 300 and a server 100 when a job is started by a certain server 100 (hereinafter referred to as "SLPAR dynamic resource assignment processing (at job start) 1100").

First, a server 100 that is about to start executing a job executes the SLPAR dynamic resource assignment requester 140, and it determines if the job to be executed is a job that corresponds to a configuration pattern registered in a SLPAR resource table 150 class. When it is a corresponding job, the server 100 creates a SLPAR job start command 901 based on the information registered in the configuration pattern corresponding to the job prior to starting job execution. Then, the server 100 sends the created SLPAR job start command 901 to the storage system 300 prior to starting job execution (Step 1100).

The management unit 400 of the storage system 300 that received the SLPAR job start command 901 (Step 1110) executes job start processing 1200 by executing the SLPAR dynamic resource assignment program 460. The details of this job start processing 1200 will be explained further hereinbelow (Step 1111). The management unit 400, which executes job start processing 1200, determines whether or not the reconfiguration (here, the addition of resources to a SLPAR) of the resource assignment of a SLPAR corresponding to the server 100, which sent the SLPAR job start command 901, was carried out as a result of the execution of this process (Step 1112). When the SLPAR resource assignment has been reconfigured (here, the addition of resources), the management unit 400 creates a SLPAR job start reply 911 (more specifically, sets resource Added information in the 911-3 field of command 911) comprising information of the resource assignment reconfiguration (here, Added), and sends it to the server 100, which sent the SLPAR job start command 901 (Step 1113).

By contrast, when there is no resource assignment reconfiguration (here, when resource Added was not generated), the management unit 400 creates a SLPAR job start reply 911 (more specifically, sets resource Not Added information in the 911-3 field of command 911) comprising information of no resource assignment reconfiguration (here, Not Added), and sends it to the server 100 which sent the SLPAR job start command 901 (Step 1114). The server 100, which receives the SLPAR job start reply 911 (Step 1101), sets the resource assignment reconfiguration (Added/Not Added) in the SLPAR resource table 150 based on the information registered in field 911-3 of the received command. As a result of this, the server 100 comes to recognize that the SLPAR, which it will be using, has the resources, of the class set in the SLPAR resource table 150, set in the configuration pattern corresponding to the job it will be executing. Thereafter, the server 100 starts executing the job using the SLPAR to which the reconfigured resources were assigned (Step 1102).

Figure 9:
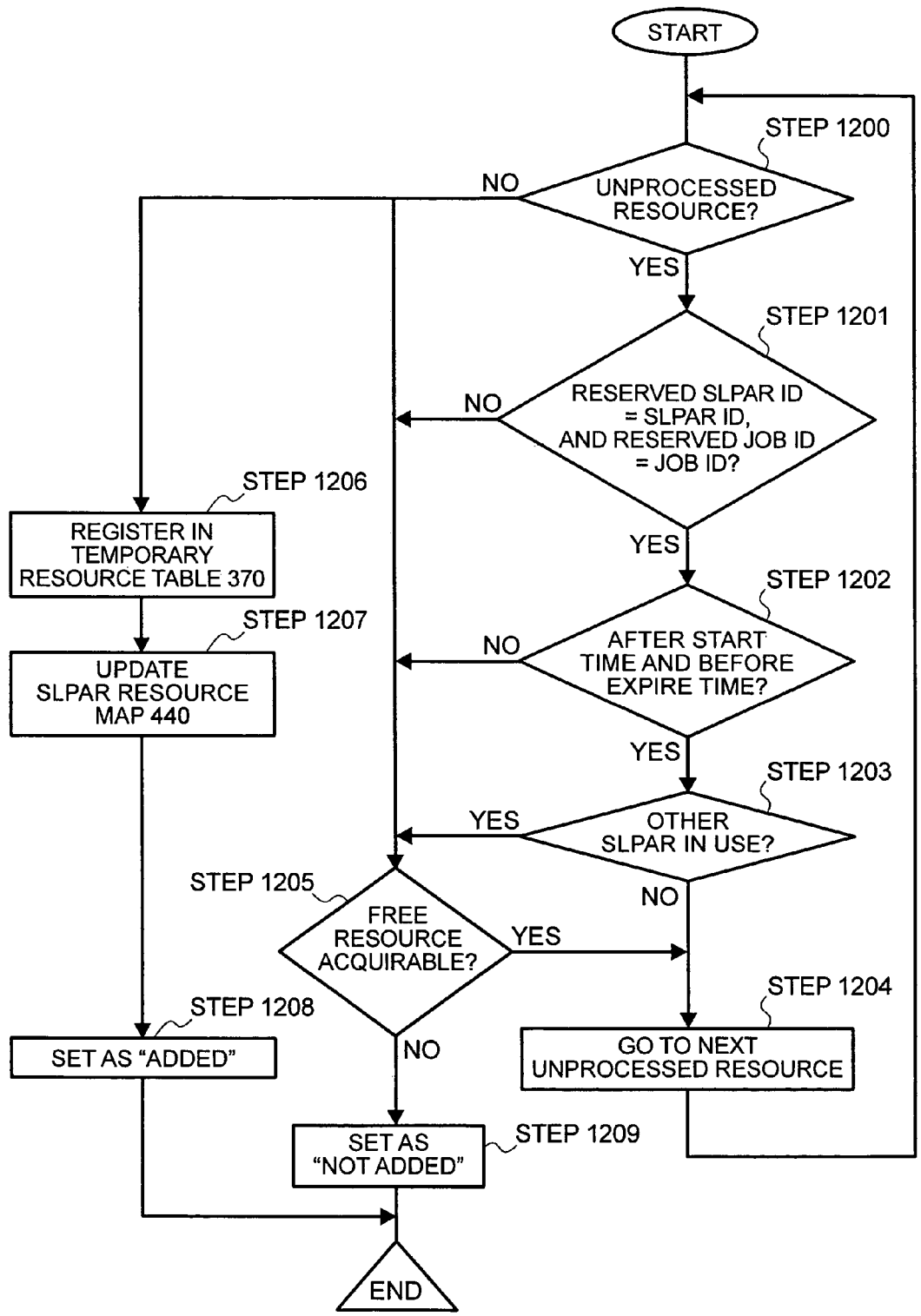
FIG. 9 is a diagram showing an example of a flowchart of processing at the time of job start.

FIG. 9 is a diagram showing an example of the processing procedures of job start processing 1200.

The management unit 400, which received the SLPAR job start command 901, specifies the job to be executed and the SLPAR, which the server 100 that sent the SLPAR job start command 901 will use, based on the information registered in the SLPAR ID (900-3) and Job ID (900-4) of the received SLPAR job start command 901. Then, the management unit 400 confirms whether or not the resource assignment reconfiguration (here, Added) is necessary for this specified SLPAR job for each resource by referencing the SLPAR resource map 440 (Step 1200).

When there are resources for which resource assignment reconfiguration is necessary, the management unit 400 confirms the presence of the resources to be secured by reconfiguration using the information registered in the free resource table 450 (Step 1201 through 1209). This procedure will be explained hereinbelow.

First of all, the management unit 400 confirms whether or not resources have been reserved for the specified SLPAR job by referencing the information registered in the free resource table 450. More specifically, first the management unit 400 ascertains whether or not there exists resources for which the grouping of the specified SLPAR ID and job ID coincide with the grouping of the information registered in the reserved SLPAR ID and reserved job ID of the free resource table 450. For example, when the specified SLPAR and job ID grouping is (SLPAR 1, Job 2), virtual devices Vdev5 and 6 correspond to this grouping (Step 1201).

When resources that coincide with the specified SLPAR and job ID grouping are confirmed, next, the management unit 400 confirms whether or not the present point in time is the time period for which the confirmed resources are reserved. More specifically, it determines whether or not the present point in time lies between the time registered in the start time entry and expiration time entry of the free resource table 450 of the confirmed resources. In addition, when it is the registered time period, the management unit 400 determines whether or not these resources are being used by another SLPAR (Steps 1202, 1203).

When the specified SLPAR and job ID grouping is not found in the free resource table 450, or when it is not the time for which the confirmed resources are reserved, or when it is the reserved time, but the resources are temporarily assigned to another SLPAR, the management unit 400 treats the resources to be assigned to the specified SLPAR job as not being reserved, and it searches the free resource table 450 and extracts resources that are not reserved for any SLPAR. More specifically, the management unit 400 confirms whether or not there are resources for which information has not been registered in the reserved SLPAR ID fields and reserved job ID fields of the free resource table 450.

When all of the resources are reserved, the management unit 400 confirms whether or not there are resources, which, although reserved, are not the target of resource assignment at the present time. More specifically, the management unit 400 extracts resources for which the current time is not included in the time period registered in the start time field and expiration time field of the free resource table 450. When these kinds of resources cannot be found, all of the resources registered in the free resource table 450 are reserved and all of them are in use at that time. By contrast, when a plurality of resources are extracted, the management unit 400 selects from there among those resources which have the lowest probability of being utilized (For example, resources whose starting times are the furthest from the current point in time).

Furthermore, when information is registered in the reserved SLPAR ID and reserved job ID in the free resource table 450, but the start time and expiration time are not specified, the following two ways of handling this are considered. The first is a method, wherein this reservation is considered to have a higher priority than another reservation (one for which the time is specified), and assignment to another SLPAR is never performed. The other method is one wherein this reservation is considered to have a lower priority than another reservation, and this reservation is selected as the highest priority in this step.

Further, in Step 1202, when a resource that does not coincide with the reserved time period is found, if this resource is not being utilized in another configuration pattern, this resource can be used as-is in resource assignment (Step 1205).

With regard to certain resources, when all of the resources are reserved, and all of the resources are being utilized, the management unit 400 determines that it cannot reconfigure the resource assignment for a specified SLPAR job, and cancels the reconfiguration of the resource assignment (Step 1209).

When a resource is selected in Steps 1201, 1202, or 1203, the management unit 400 repeats the above-described processing for another resource, and ultimately registers the ID of the selected resource in the temporal resource table 370. Furthermore, for a resource for which the virtual resource manager is not the management unit 400, the storage management unit 600 registers the assignment information of that resource in the temporal resource table 370 (Steps 1204, 1206).

Thereafter, the management unit 400 changes the information of the SLPAR resource map 440, more specifically, it changes the information indicating whether or not a configuration pattern is in use. Furthermore, when resource assignment is reconfigured using a resource other than a reserved resource, the management unit 400 registers information indicating that the resources set in a configuration pattern differ from the resources actually assigned. Further, in this case, the management unit 400 includes information indicating that the resources set in the configuration pattern differ from the resources actually assigned in a SLPAR job start reply 911, and it sends it to the server 100. The server 100 temporarily updates the information of the pre-registered pattern with the sent information (evacuates the registered information to a separate location), and it utilizes the SLPAR based on this updated information (Steps 1207, 1208).

FIG. 10 is a diagram showing an example of the processing procedures between a storage system 300 and a server 100 when a job is stopped by a certain server 100 (hereinafter referred to as "SLPAR dynamic resource assignment processing (at job finish) 1300").

First, a server 100 attempting to finish the execution of a job executes SLPAR dynamic resource assignment requestor 140, and it determines whether or not the job, which is being finished, is a job corresponding to the configuration pattern registered in the class of the SLPAR resource table 150. When it is a corresponding job, the server 100 creates a SLPAR job finish command 902 based on the information registered in the configuration pattern corresponding to the job after finishing job execution. Then, the server 100 sends the created SLPAR job finish command 902 to the storage system 300 after finishing job execution (Step 1310).

The management unit 400 of the storage system 300 that received the SLPAR job finish command 902 (Step 1310) executes job finish processing 1400 by executing the SLPAR dynamic resource assignment program 460. The details of this job finish processing 1400 will be explained further hereinbelow (Step 1311). The management unit 400, which executes job finish processing 1200, creates a SLPAR job finish reply 912, and sends it to the server 100 which sent the SLPAR job finish command 902 (Step 1312).

The server 100, which receives the SLPAR job finish reply 912 (Step 1301), sets a resource assignment reconfiguration (Not Added) in the SLPAR resource table 150. As a result of this, the server 100 comes to recognize that the SLPAR, which it is using, has the resources, of the class set in the SLPAR resource table 150, set in the "Basic" configuration pattern. Thereafter, the server 100 continues other processing using the SLPAR to which the "Basic" configuration pattern resources were assigned (Step 1302).

Figure 11:
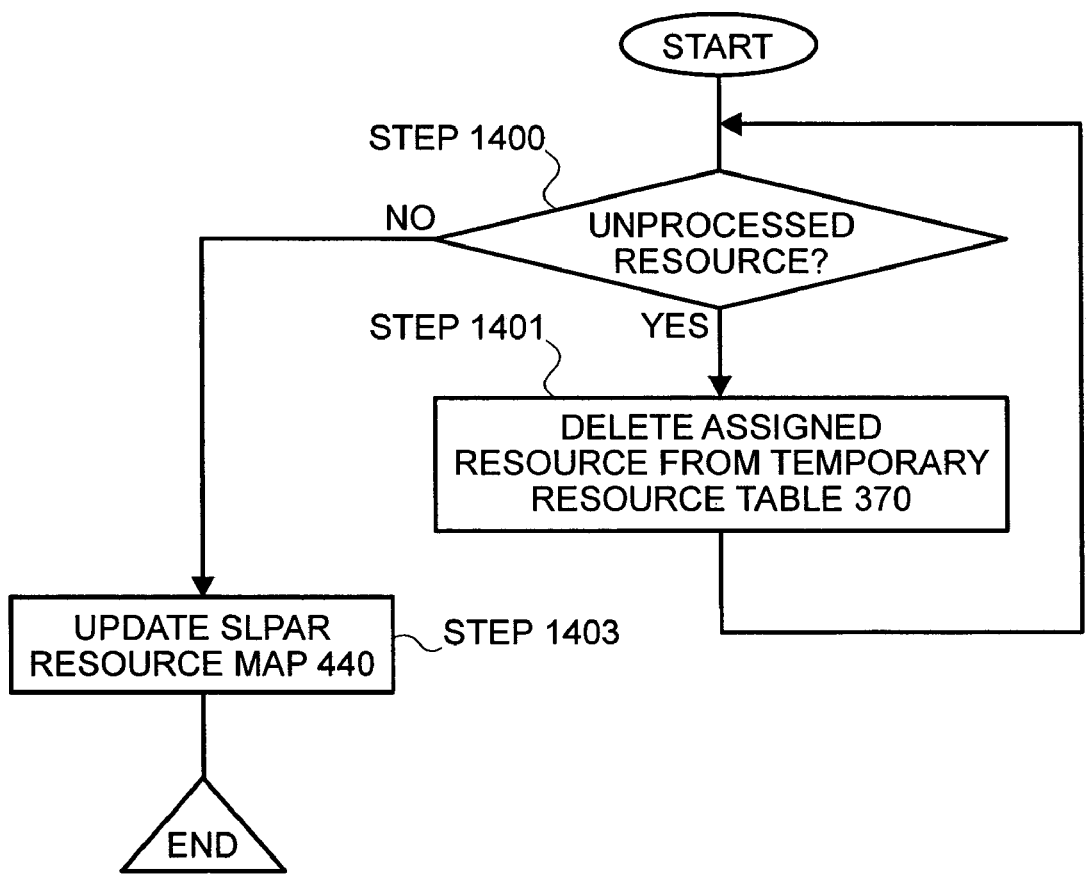
FIG. 11 is a diagram showing an example of a flowchart of processing at the time of job completion.

FIG. 11 is a diagram showing an example of the processing procedures of job finish processing 1400.

The storage system 300, which received the SLPAR job finish command 902, specifies the SLPAR for which resource assignment is to be reconfigured based on the SLPAR ID and Job ID comprising the received SLPAR job finish command 902. Then, based on the specified information, it changes the information of the assigned resources corresponding to this job of this SLPAR, which is registered in the temporal resource table 370 (in this case, changes the information registered in the temporal resource table 370 to the "Basic" configuration pattern in order to return to the resource assignment of the "Basic" configuration pattern) (Step 1401.) Thereafter, the management unit 400 sets the information of the configuration pattern corresponding to this job of this SLPAR of the SLPAR resource map 440 as Not Added (Step 1403).

The details of reservation will be explained below. As described hereinabove, "Reserve" means to secure beforehand using resources of the free resource table 450, which will become necessary for executing a job corresponding to a certain configuration pattern. Reservation information can be set at initialization for processing that is important for a system user. However, when a reservation is executed at initialization for all free resources, making it impossible to use them in other logical partitions, dynamic resource assignment is essentially eliminated.

Accordingly, in this embodiment, the setting of a class configuration pattern is performed at initialization, and the reserving of resources specified in this configuration pattern, for example, is carried out at a predetermined time prior to starting the execution of a job corresponding to this configuration pattern, and when the job is finished (or after the passage of a predetermined time following job finish), this reservation is canceled. By so doing, it becomes easy to secure resources that are not reserved in the storage system 300 (That is, to reduce the probability of generating a state in which resource assignment becomes impossible).

Furthermore, reservations are carried out by each server 100 issuing a command requesting reservations at a predetermined time (for example, 30 seconds before the start of a job) based on job overview information of a SLPAR resource table registered in itself. Or, a server 100 can register information related to a job execution schedule in the storage system 300, and the storage system 300 can execute reservations based on this schedule. Further, the canceling of reservations can be carried out together with resource assignment reconfiguration processing, which the storage system 300 performs when a job is finished, and the storage system 300 can also automatically cancel reservations after the passage of a fixed time following job completion. Or, a server 100 can also issue a command requesting the cancellation of reservations to the storage system 300 after the passage of a fixed time following job completion.

Figure 12:
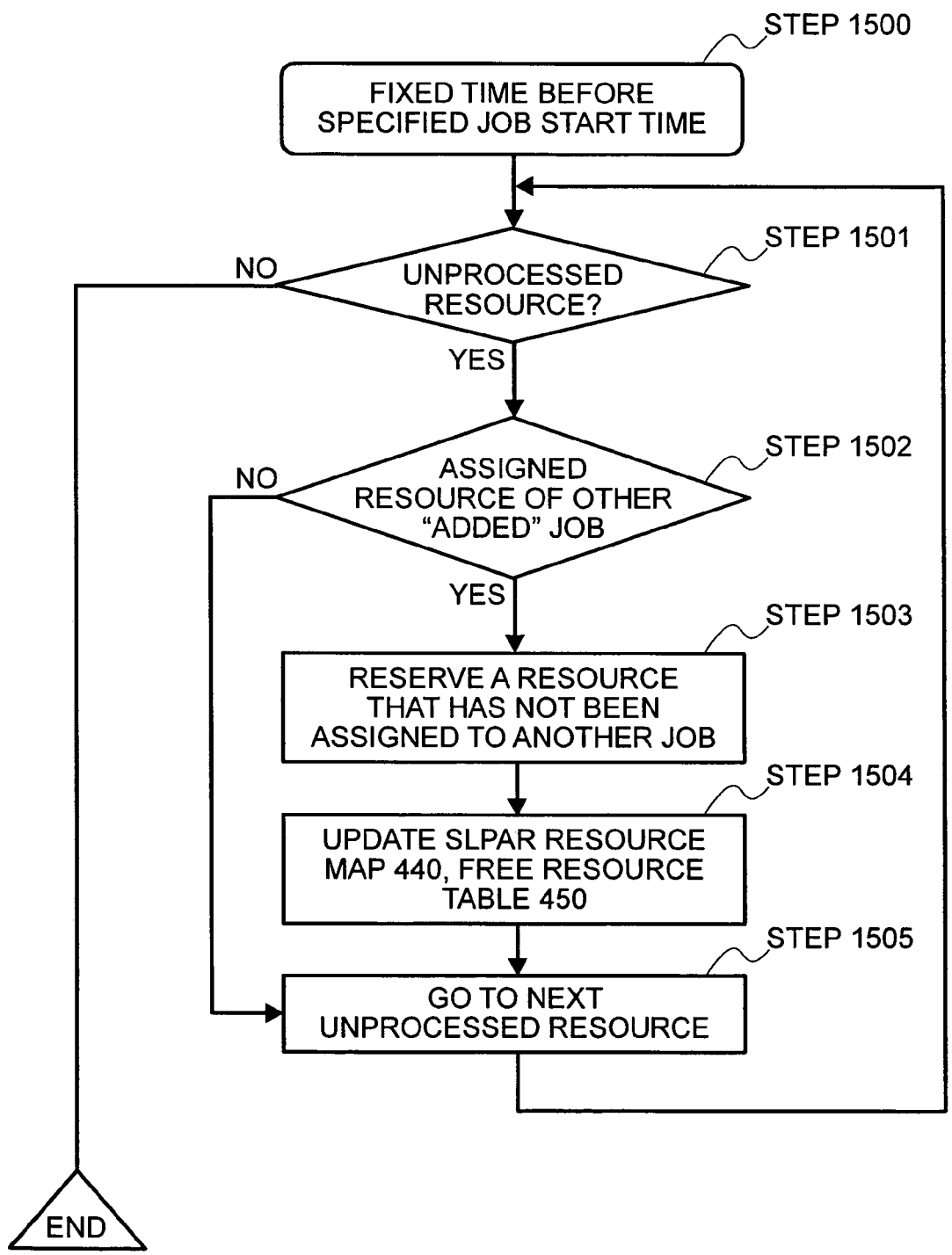
FIG. 12 is a diagram showing an example of a flowchart of reserved resource confirmation processing.

FIG. 12 is a diagram showing an example of processing procedures either when a server 100 requests the storage system 300 to make a reservation, or when the storage system itself starts reservation processing (hereinafter referred to as "reserved resource confirmation processing 1500").

The management unit 400 of a storage system 300, which either received a reservation request, or started reservation processing on the basis of a schedule (Step 1500), confirms the presence of resources set in a configuration pattern registered in the SLPAR resource map 440 for a configuration pattern associated with a job for which the resources are being reserved by executing the SLPAR dynamic resource assignment program 460 (Step 1501). When resources are registered in a configuration pattern, a determination is made as to whether or not these resources are being utilized in a job corresponding to another configuration pattern (Step 1502). When the registered resources are being used in another job, the management unit 400 searches for a resource for which a reserved SLPAR ID and reserved job ID are not registered in the free resource table 450. Then, the management unit 400 assigns the retrieved free resource to a job targeted for the reservation (Step 1503), and updates the SLPAR resource map 440 and free resource table 450 (Step 1504). Then, it executes the processing of Step 1502 for the next reserved resource (Step 1505).

Conversely, when a registered resource is not being used in another job, when there is a SLPAR and job ID for reserving this resource, as well as execution time period information (when it is comprised in a command, or when schedule information in registered in the storage system 300), the management unit 400 also registers this time period information in the reserved SLPAR ID and reserved job ID fields of the free resource table 450 corresponding to the resources registered in a configuration pattern of the SLPAR resource map 440. After registering this information, the management unit 400 carries out the processing of Step 1505.

The processing procedures for reservation cancellation will be explained below.

When a job is finished, after the passage of a fixed period of time subsequent to the job being finished, or upon receiving a reservation cancellation notification from a server 100, the storage system 300 references the free resource table 450, and it confirms the presence of reservations for resources associated with the finished job (or the specified job). When an associated job reservation exists, the management unit 400 deletes the information registered in the reserved SLPAR ID, reserved job ID, start time and expire time fields of the free resource table 450 corresponding to this resource.

Furthermore, in this embodiment, the storage system 300 has recognized the execution of a job upon receiving a command from a server 100, and has executed resource assignment based on a configuration pattern associated with this job. However, as another embodiment, the constitution can be such that the storage system 300 spontaneously performs a resource assignment reconfiguration based on information of a job execution schedule. In this case, for example, the storage system 300 can at any time check the job execution time information set when a resource was reserved, and assign the reserved resource when it becomes time to execute this job (or at a fixed time prior thereto).

Further, in this embodiment, when a job is finished, the storage system 300 performs an operation for returning a resource assignment to the "Basic" configuration pattern. However, as another embodiment, an example wherein job completion and the reconfiguration of a resource assignment are not synchronized can be considered. For example, when a plurality of jobs are executed consecutively, and the storage system 300 is without spare resources for assignment, resource assignment reconfiguration can be performed at the intervals between jobs.

In accordance with the present invention, it is possible to enhance the utilization factor of hardware resources while satisfying the required service level, which changes in accordance with the job to be executed. It is also possible to readily determine the appropriate hardware resource configuration for each logical partition in accordance with the job type being executed.

What is claimed is:

1. A storage system comprising:
a control unit;
a plurality of disk devices connected to the control unit; and
a plurality of ports connectable to a plurality of computers and connected to the control unit,
wherein the control unit configures a plurality of logical partitions used for a plurality of the computers by using resources which the storage system includes,
wherein the control unit re-configures the resources of one of the plurality of logical partitions based on one of predetermined patterns,
wherein said one of the patterns includes information which indicates a combination of the resources to be assigned to the one of the plurality of logical partitions,
wherein the control unit has resource information which includes information whether the resources are assigned to the plurality of logical partitions or not, and
wherein the control unit re-configures the one of the plurality of logical partitions by using part of the resources which are not assigned to the plurality of logical partitions based on the resource information and the one of the patterns.

2. A storage system according to claim 1,
wherein the control unit re-configures the one of the plurality of logical partitions when the control unit receives a command from one of the plurality of computers that uses the one of the plurality of logical partitions.

3. A storage system according to claim 2,
wherein the one of the patterns is related to one of a plurality of jobs which is executed in the one of the plurality of computers.

4. A storage system according to claim 3,
wherein the command is issued when the one of the plurality of jobs is executed in the one of the plurality of computers, and
wherein the control unit selects the one of patterns for re-configuring when the control unit receives the command.

5. A storage system according to claim 4,
wherein the resources include a plurality of the ports, a plurality of processors which the control unit includes, and a memory area of a cache memory which the control unit includes.

6. A storage system according to claim 5,
wherein the control unit secures a predetermined amount of the resources which is sufficient for the one of the patterns from the part of resources which are not assigned to the plurality of logical partitions by using the resource information before receiving the command, and
wherein the control unit re-configures the one of the plurality of logical partitions based on the predetermined amount of resources when the control unit receives the command.

7. A storage system according to claim 6,
wherein the control unit releases the predetermined amount of resources after execution of the one of the jobs.

8. A storage system according to claim 7,
wherein the control unit secures or releases the predetermined amount of resources based on a schedule of execution of the one of the jobs.

9. A storage system according to claim 8,
wherein the patterns include a basic pattern which includes information of an average amount of resources to be used in the plurality of logical partitions.

10. A storage system according to claim 1,
wherein the one of the patterns is related to the one of the jobs which is executed in the one of the plurality of computers, and
wherein the control unit re-configures the one of the plurality of logical partitions synchronized with a schedule of execution of the one of the jobs.

11. A system comprising:
a plurality of computers; and
a storage system connected to the plurality of computers,
wherein the storage system configures a plurality of logical partitions used for the plurality of the computers by using resources which the storage system includes,
wherein the storage system re-configures the resources of one of the plurality of logical partitions based on one of predetermined patterns,
wherein said one of the patterns includes information which indicates a combination of the resources to be assigned to the one of the plurality of logical partitions,
wherein the storage system has resource information which includes information whether the resources are assigned to the plurality of logical partitions or not, and
wherein the storage system re-configures the one of the plurality of logical partitions by using part of the resources which are not assigned to the plurality of logical partitions based on the resource information and the one of the patterns.

12. A system according to claim 11,
wherein one of the plurality of computers executes a plurality of jobs by using the one of the plurality of logical partitions,
wherein the one of the patterns has a connection with one of the plurality of jobs, and wherein the storage system re-configures the one of the plurality of logical partitions when the one of the plurality of computers is about to start the one of the plurality of jobs.

13. A system according to claim 12, wherein the one of the computers issues a command to the storage system when the one of the plurality of jobs is started, and wherein the storage system re-configures the one of the plurality of logical partitions when the storage system receives the command.

14. A system according to claim 13, wherein the one of the plurality of computers includes job information that includes information of a schedule of execution of the one of the plurality of jobs, wherein the one of the plurality of computers issues a second command before executing the one of the plurality of jobs based on the job information, wherein the storage system secures a predetermined amount of the resources which is sufficient for the one of patterns from the part of resources which are not assigned to the plurality of logical partitions by using the resource information when the storage system receives the second command, and wherein the storage system re-configures the one of the plurality of logical partitions based on the predetermined amount of resources when the storage system receives the command.

15. A system according to claim 14, wherein the one of the plurality of computers issues a third command after execution of the one of the plurality of jobs based on the job information, and wherein the storage system releases the predetermined amount of resources when the storage system receives the third command.

* * * * *